United States Patent
Oka et al.

(10) Patent No.: US 9,328,237 B2
(45) Date of Patent: May 3, 2016

(54) TWO-PACK TYPE EPOXY RESIN COMPOSITION FOR FIBER-REINFORCED COMPOSITE MATERIALS, AND FIBER-REINFORCED COMPOSITE MATERIAL

(71) Applicant: Toray Industries, Inc., Tokyo (JP)

(72) Inventors: Hideki Oka, Nagoya (JP); Nobuyuki Tomioka, Nagoya (JP); Shirou Honda, Nagoya (JP)

(73) Assignee: Toray Industries, Inc. (JP)

( * ) Notice: Subject to any disclaimer, the term of this patent is extended or adjusted under 35 U.S.C. 154(b) by 1 day.

(21) Appl. No.: 14/352,342

(22) PCT Filed: Oct. 23, 2012

(86) PCT No.: PCT/JP2012/077299
§ 371 (c)(1),
(2) Date: Apr. 17, 2014

(87) PCT Pub. No.: WO2013/065516
PCT Pub. Date: May 10, 2013

(65) Prior Publication Data
US 2014/0288214 A1    Sep. 25, 2014

(30) Foreign Application Priority Data
Oct. 31, 2011    (JP) .................... 2011-238514

(51) Int. Cl.
| | |
|---|---|
| B32B 27/04 | (2006.01) |
| B32B 27/38 | (2006.01) |
| C08L 63/00 | (2006.01) |
| C08L 63/02 | (2006.01) |
| C08J 5/04 | (2006.01) |
| C08G 59/42 | (2006.01) |
| C08G 59/62 | (2006.01) |
| C08J 5/24 | (2006.01) |
| C08G 59/68 | (2006.01) |

(52) U.S. Cl.
CPC .............. *C08L 63/00* (2013.01); *B32B 27/04* (2013.01); *B32B 27/38* (2013.01); *C08G 59/4284* (2013.01); *C08G 59/621* (2013.01); *C08G 59/686* (2013.01); *C08G 59/688* (2013.01); *C08J 5/04* (2013.01); *C08J 5/042* (2013.01); *C08J 5/24* (2013.01); *C08J 2363/00* (2013.01)

(58) Field of Classification Search
None
See application file for complete search history.

(56) References Cited

U.S. PATENT DOCUMENTS

| | | | |
|---|---|---|---|
| 2009/0131556 A1* | 5/2009 | Honda et al. | ........... 523/207 |
| 2011/0097568 A1 | 4/2011 | Kamae et al. | |

FOREIGN PATENT DOCUMENTS

| | | | |
|---|---|---|---|
| CN | 101945944 A | | 1/2011 |
| JP | 63-122725 A | | 5/1988 |
| JP | 01-115940 A | | 5/1989 |
| JP | 11-021421 A | | 1/1999 |
| JP | 2000-219799 A | | 8/2000 |
| JP | 2002-012649 A | | 1/2002 |
| JP | 2002-12649 A | * | 1/2002 |
| JP | 2004-059709 A | | 2/2004 |
| JP | 2009-007420 A | | 1/2009 |
| JP | 2009-521566 A | | 6/2009 |
| JP | 2010-007040 A | | 1/2010 |
| JP | 2011-213991 A | | 10/2011 |
| WO | 95/22437 | | 8/1995 |
| WO | 2006/022693 | | 3/2006 |
| WO | 2007/125759 A1 | | 11/2007 |
| WO | 2008/051373 | | 5/2008 |
| WO | 2011/052161 | | 5/2011 |

OTHER PUBLICATIONS

Supplementary European Search Report dated Jun. 10, 2015 of corresponding European Application No. 12846109.2.

* cited by examiner

*Primary Examiner* — Robert Sellers
(74) *Attorney, Agent, or Firm* — DLA Piper LLP (US)

(57) ABSTRACT

A two-pack type epoxy resin composition for fiber-reinforced composite materials includes components [A] to [D], with component [D] being a liquid at room temperature or a solid having a melting point of 130° C. or less: [A] an epoxy resin; [B] an acid anhydride; [C] a compound that has an average of 2.5 or more hydroxyphenyl structures in each molecule; and [D] an organic phosphorus compound or imidazole derivative.

10 Claims, No Drawings

TWO-PACK TYPE EPOXY RESIN COMPOSITION FOR FIBER-REINFORCED COMPOSITE MATERIALS, AND FIBER-REINFORCED COMPOSITE MATERIAL

TECHNICAL FIELD

This disclosure relates to a two-pack epoxy resin composition used for fiber-reinforced composite materials, a curing agent pack used for the two-pack epoxy resin composition, and a fiber-reinforced composite material produced therefrom.

BACKGROUND

The application of fiber-reinforced composite materials comprising reinforcing fibers and matrix resins is spreading in various fields, including sports and general industry, particularly aeronautics and space, as they enable material designs that best exploit the advantages of reinforcing fibers and matrix resins.

As reinforcing fibers, glass fiber, aramid fiber, carbon fiber, boron fiber and the like are used. As a matrix resin, both a thermosetting resin and thermoplastic resin can be used, though a thermosetting resin is more frequently used because of its ability to easily impregnate reinforcing fibers. Examples of a thermosetting resin include an epoxy resin, unsaturated polyester resin, vinyl ester resin, phenol resin, bismaleimide resin, and cyanate resin.

Fiber-reinforced composite materials are manufactured by applying the prepreg method, hand lay-up method, filament winding method, pultrusion method, resin transfer molding (RTM) method and other methods.

In recent years, Japanese as well as overseas automakers are striving to reduce the weight of vehicle bodies as a key parameter of fuel efficiency amid tightening environmental controls on motor vehicles around the world. The application of carbon-fiber composite materials, which only weigh about half and 70% as much as steel and aluminum, respectively, has been actively investigated. As well as weight reduction, various automobile structural parts are, in many cases, subject to high rigidity and high strength requirements, while often having complex three-dimensional shapes. This has made RTM a promising molding method because of its ability to accommodate complex shapes, combined with the use of high-rigidity high-strength continuous carbon fiber. With the RTM method, a fiber-reinforced composite material is obtained by placing a reinforcing-fiber base in a mold and, after the mold is closed, injecting a resin from a resin injection port or ports to impregnate the reinforcing fibers. After the resin is cured, the mold is opened to take out the molding. In this regard, productivity poses a major problem to the widespread use of carbon-fiber composite materials in motor vehicles and, because of this barrier, their adoption has not gone beyond some luxury cars.

With the hand lay-up method, filament winding method, pultrusion method and RTM method, a two-pack epoxy resin composition is often used from the viewpoint of moldability. A two-pack epoxy resin composition refers to an epoxy resin composition comprising a base resin pack containing an epoxy resin as the primary component and a curing agent pack containing a curing agent as the secondary component obtained by mixing the base resin pack and curing agent pack immediately before use. In contrast, an epoxy resin composition in which all the components, including the base resin and curing agent, are premixed is a one-pack epoxy resin composition. In the case of a one-pack epoxy resin composition, the curing reaction progresses even during storage, and this necessitates cold storage. In addition, a low-reactivity solid agent is often selected as the curing agent pack, and this makes it necessary to inject a one-pack epoxy resin composition into reinforcing fibers at high pressure using a press roll or the like to impregnate them. With a two-pack epoxy resin composition, on the other hand, a liquid agent can be chosen for both the base resin pack and curing agent pack, and this makes it possible to obtain a low-viscosity liquid epoxy resin composition with excellent reinforcing fiber impregnability as a mixture of a liquid base resin and liquid curing agent. Since the base resin pack and curing agent pack are stored separately, there are no specific limitations on storage conditions, and long-term storage is possible.

To realize high-level productivity as described above using the RTM method, for instance, it is not enough to just have a short resin curing time. Rather, there is also a specific need to simultaneously satisfy the four conditions listed below. First, the two packs have low and similar viscosity values and exhibit excellent mixability during the mixing to prepare a resin composition. Second, the resin composition exhibits low viscosity during impregnation of the reinforcing-fiber base and a rise in viscosity can be suppressed throughout this step to ensure excellent impregnability. Third, sufficiently fast curing is possible in the low temperature region around 100° C. This allows simplification of molding equipment and eliminates the need for heat resistance in secondary materials, thus giving rise to cost reductions, as well as excellent surface smoothness of moldings, achieved through a reduction in heat shrinkage attributable to the difference between the curing temperature and room temperature. Fourth, by the time of the demolding step, the resin has reached an adequate level of rigidity as a result of curing. This makes strain-free smooth demolding possible, while eliminating strain or deformation in the coating step, thus ensuring high dimensional accuracy in moldings.

To address these problems, an epoxy resin composition based on a combined use of an acid anhydride and phenol novolac as a curing agent has been disclosed. Since it suppresses generation of formalin and provides moldings with excellent rigidity, it is preferable as a sheet molding compound for building materials (Japanese Unexamined Patent Publication (Kokai) No. 2002-12649). However that material does not have adequate fast curing performance in the low temperature region.

Further, an epoxy resin composition based on a combined use of an acid anhydride curing agent and an organic phosphorus compound catalyst has been disclosed as an epoxy resin composition with an excellent balance between the length of the low viscosity period and that of curing time under constant temperature conditions around 100° C. (International Publication WO 2007/125759). However, that material has a problem in that it is inadequate in fast curing performance and lacks adequate resin rigidity during demolding, sometimes resulting in reduced dimensional accuracy.

In addition, an epoxy resin composition based on the use of a small amount of a carboxylic acid anhydride as an auxiliary catalyst in combination with a phenolic curing agent has been disclosed as an epoxy resin composition for electrical materials that has simultaneously achieved high heat resistance, high toughness and high adherence to copper foils (Published Japanese Translation of PCT International Publication JP 2009-521566). However, that material also fails to have adequate fast curing performance, while being unsuitable for molding applications due to its need for a solvent.

As can be seen from the above, a two-pack epoxy resin composition that accommodates high-cycle molding (a large number of molding cycles in a given amount of time, made possible by reducing the length of time required to execute a single molding cycle), particularly RTM, and simultaneously meets all the requirements set to realize high productivity does not yet exist.

It could therefore be helpful to provide a two-pack epoxy resin composition that offers excellent workability during resin preparation, maintains low viscosity during impregnation of reinforcing fibers, thus exhibiting excellent impregnability, is quickly cured during molding and provides fiber-reinforced composite materials with high dimensional accuracy, a curing agent pack, and a fiber-reinforced composite material produced therefrom.

SUMMARY

We provide a two-pack epoxy resin composition for fiber-reinforced composite materials having a specific constitution. Namely, the two-pack epoxy resin composition for fiber-reinforced composite materials comprises components [A] to [D] as specified below, with component [D] being a liquid at room temperature or a solid having a melting point of 130° C. or less:

[A] an epoxy resin;
[B] an acid anhydride;
[C] a compound that has an average of 2.5 or more hydroxyphenyl structures in each molecule; and
[D] an organic phosphorus compound or imidazole derivative.

It is necessary that such a two-pack epoxy resin composition for fiber-reinforced composite materials have a mass mixing ratio between components [B] and [C] of 95:5 to 65:35.

It is preferable that such a two-pack epoxy resin composition for fiber-reinforced composite materials have a mass mixing ratio between components [B] and [C] of 95:5 to 81:19.

It is preferable that component [C] of such a two-pack epoxy resin composition for fiber-reinforced composite materials be a phenol novolac with a softening point of 100° C. or less or a cresol novolac with a softening point of 100° C. or less.

It is preferable that component [A] of such a two-pack epoxy resin composition for fiber-reinforced composite materials be a bisphenol A-type epoxy resin.

It is preferable that component [B] of such a two-pack epoxy resin composition for fiber-reinforced composite materials be an acid anhydride having an alicyclic structure.

It is preferable that such a two-pack epoxy resin composition for fiber-reinforced composite materials have a specific temperature T at which $0.5 \leq t10 \leq 4$, $0.5 \leq t90 \leq 9$ and $1 < t90/t10 \leq 2.5$ hold, where t10 and t90 are lengths of time (in minutes) that the cure index, as obtained in a dielectric measurement performed while maintaining a constant temperature, takes to reach 10% and 90%, respectively.

It is preferable that such a two-pack epoxy resin composition for fiber-reinforced composite materials have a viscosity at 25° C. of 0.1 to 2.5 Pa·s.

It is preferable that such a two-pack epoxy resin composition for fiber-reinforced composite materials be obtained by mixing a base resin pack comprising component [A] and a curing agent pack comprising components [B], [C] and [D].

It is preferable that the curing agent pack of such a two-pack epoxy resin composition for fiber-reinforced composite materials have a viscosity at 25° C. of 0.05 to 1.8 Pa·s.

To solve the above problems, a fiber-reinforced composite material has a specific configuration. Namely, the fiber-reinforced composite material is produced by combining the above two-pack epoxy resin composition for fiber-reinforced composite materials with reinforcing fibers and curing it.

It is preferable that reinforcing fibers of such a fiber-reinforced composite material be carbon fiber.

We thus provide fiber composite materials having high dimensional accuracy with high productivity, thanks to excellent workability during resin preparation, excellent resin impregnability based on the retention of low viscosity during the impregnation of reinforcing fibers and fast curing during the molding step.

DETAILED DESCRIPTION

We first describe the epoxy resin composition.

The epoxy resin composition is a two-pack epoxy resin composition for fiber-reinforced composite materials that comprises components [A] to [D] as specified below, with component [D] being a liquid at room temperature or a solid having a melting point of 130° C. or less:

[A] an epoxy resin;
[B] an acid anhydride;
[C] a compound that has an average of 2.5 or more hydroxyphenyl structures in each molecule; and
[D] an organic phosphorus compound or imidazole derivative.

Component [A] is an epoxy resin. An epoxy resin means a compound that has two or more epoxy groups in a single molecule.

Specific examples of component [A] include an aromatic glycidyl ether obtained from a phenol having two or more hydroxyl groups, an aliphatic glycidyl ether obtained from an alcohol having two or more hydroxyl groups, a glycidyl amine obtained from an amine, an epoxy resin having an oxirane ring, and a glycidyl ester obtained from a carboxylic acid having two or more carboxyl groups.

Examples of an aromatic glycidyl ether available for use as component [A] include a bisphenol-based diglycidyl ether such as bisphenol A diglycidyl ether, bisphenol F diglycidyl ether, bisphenol AD diglycidyl ether and bisphenol S diglycidyl ether, a polyglycidyl ether of a novolac obtained from phenol, alkyl phenol or the like, resorcinol diglycidyl ether, hydroquinone diglycidyl ether, 4,4'-dihydroxybiphenyl diglycidyl ether, 4,4'-dihydroxy-3,3',5,5'-tetramethyl-biphenyl diglycidyl ether, 1,6-dihydroxynaphthalene diglycidyl ether, 9,9'-bis(4-hydroxyphenyl)fluorene diglycidyl ether, tris-(p-hydroxyphenyl)methane triglycidyl ether, tetrakis(p-hydroxyphenyl ethane tetraglycidyl ether, and a diglycidyl ether with an oxazolidone backbone obtained by having bisphenol A diglycidyl ether and a bifunctional isocyanate react with each other.

Examples of an aliphatic glycidyl ether available for use as component [A] include ethylene glycol diglycidyl ether, propylene glycol diglycidyl ether, 1,4-butanediol diglycidyl ether, 1,6-hexanediol diglycidyl ether, neopentyl glycol diglycidyl ether, cyclohexanedimethanol diglycidyl ether, glycerin diglycidyl ether, glycerin triglycidyl ether, trimethylol ethane diglycidyl ether, trimethylol ethane triglycidyl ether, trimethylolpropane diglycidyl ether, trimethylolpropane triglycidyl ether, pentaerythritol tetraglycidyl ether, dodecahydrobisphenol A diglycidyl ether, and dodecahydrobisphenol F diglycidyl ether.

Examples of a glycidyl amine available for use as component [A] include diglycidyl aniline, diglycidyl toluidine, triglycidyl aminophenol, tetraglycidyl diaminodiphenyl methane, tetraglycidyl xylylene diamine, and a halogen or alkylic substitution product or hydrogenated product thereof.

Examples of an epoxy resin having an oxirane ring available for use as component [A] include vinyl cyclohexene dioxide, dipentene dioxide, 3,4-epoxycyclohexane carboxylic acid 3,4-epoxycyclohexylmethyl, adipic acid bis(3,4-epoxycyclohexylmethyl), dicyclopentadiene dioxide, bis(2,3-epoxycyclopentyl)ether, and an oligomer of 4-vinyl cyclohexene dioxide.

Examples of a glycidyl ester available for use as component [A] include phthalic acid diglycidyl ester, terephthalic acid diglycidyl ester, hexahydrophthalic acid diglycidyl ester, and dimer acid diglycidyl ester.

Of these, a diglycidyl ether of a bisphenol compound, namely a bisphenol-type epoxy resin, especially a bisphenol A-type epoxy resin, is particularly advantageously used as component [A] as it excels in terms of the balance between the viscosity of the resin composition and the mechanical and physical properties of the cured resin product obtained such as heat resistance and elastic modulus. It is preferable that such component [A] account for 60 to 100, more preferably 80 to 100, mass % of the total epoxy resin.

It is preferable that the number of repeating units of such a bisphenol A-type epoxy resin be within the 0 to 0.2, more preferably 0 to 0.1, range. The number of repeating units corresponds to the n in the chemical structural formula of the bisphenol A-type epoxy resin as commonly expressed by chemical formula 1. If the number of repeating units exceeds 0.2, the viscosity of the epoxy resin composition is high, leading to a deterioration in reinforcing fiber impregnability and, possibly, inadequacy in the heat resistance of the obtained fiber-reinforced composite material, as well.

and physical properties of cured products, it is effective to use an acid anhydride having an alicyclic structure, with one having a cycloalkane or cycloalkene ring preferred. Specific examples of such an acid anhydride having an alicyclic structure include a hexahydro phthalic anhydride, methyl hexahydro phthalic anhydride, methyldihydro nadic anhydride, 1,2,4,5-cyclopentane tetracarboxylic dianhydride, 1,2,3,6-tetrahydrophthalic anhydride, methyl-1,2,3,6-tetrahydrophthalic anhydride, nadic anhydride, methyl nadic anhydride, bicyclo[2,2,2]octo-7-ene-2,3,5,6-tetracarboxylic dianhydride, and 4-(2,5-dioxotetrahydro furan-3-yl)-3-methyl-1,2,5,6-tetrahydrophthalic anhydride. Of these, hexahydro phthalic anhydride, tetrahydrophthalic anhydride, nadic anhydride and a selected alkyl substitution product thereof are particularly advantageously used as component [B], as they excel in terms of the balance between the viscosity of the resin composition, on the one hand, and the heat resistance and the elastic modulus and other mechanical and physical properties of the cured resin product, on the other. In this regard, even when an acid anhydride having an alicyclic structure is used as component [B], the epoxy resin composition may contain acid anhydrides without an alicyclic structure.

Component [C] is a compound that has an average of 2.5 or more hydroxyphenyl structures in each molecule. More specifically, it is a compound whose chemical structure has an average of 2.5 or more structures containing phenol as illustrated in chemical formula 2 in each molecule, and acts as a curing agent for an epoxy resin. The average number of such hydroxyphenyl structures is on a weight equivalent basis. Though there are no specific limitations on the method to determine the average number of hydroxyphenyl structures, a

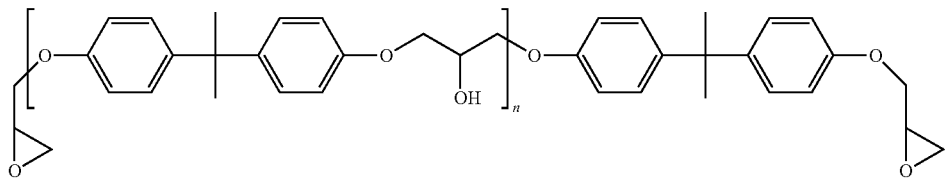

It is preferable that the epoxy equivalent of such a bisphenol A-type epoxy resin be 170 to 220, more preferably 170 to 195. This epoxy equivalent usually becomes larger as the number of repeating units increases and smaller as the number of repeating units decreases. If the epoxy equivalent falls below 170, low molecular-weight impurities are sometimes present, leading to a deterioration in surface quality due to evaporation during the molding step. If, on the other hand, the epoxy equivalent exceeds 220, the viscosity of the epoxy resin composition is high, leading to a deterioration in reinforcing fiber impregnability and, possibly, inadequacy in the rigidity of the obtained fiber-reinforced composite material, as well.

Component [B] is an acid anhydride, specifically a carboxylic acid anhydride and more specifically a compound that has one or more carboxylic acid anhydride groups capable of reacting with epoxy groups in an epoxy resin in a single molecule and acts as a curing agent for an epoxy resin.

Component [B] may be an acid anhydride that, like a phthalic anhydride, has an aromatic ring but does not have an alicyclic structure or an acid anhydride that, like a succinic anhydride, has neither an aromatic ring nor an alicyclic structure. However, in view of the ease of handling associated with a low-viscosity liquid and the heat resistance and mechanical typical method for phenol novolac and other compounds having a distribution in the number of repeating units, for instance, uses a molecular weight distribution chart obtained from gel permeation chromatography (GPC) and calculates the ratio between peak areas, each corresponding to the number of repeating units.

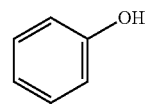

Though there are no specific limitations on component [C], various phenol resins such as a phenol novolac resin, phenol aralkyl resin, biphenyl novolac-type phenol resin, cresol novolac resin, naphthol novolac resin, tris-(hydroxyphenyl) methane, tetrakis (hydroxyphenyl) ethane, a terpene backbone-containing phenol compound and dicyclopentadiene backbone-containing phenol resin, are advantageously used. Of them, phenol novolac, cresol novolac and the like are preferable from the viewpoint of ease of handling and mechanical and physical properties of cured products, with phenol novolac having a softening point of 100° C. or less or cresol novolac having a softening point of 100° C. or less particularly preferred.

Surprisingly, the use of component [C] in combination with component [B] as a curing agent makes it possible to shorten the time taken to complete curing, while keeping the low viscosity period long, as required of a resin composition for RTM. Though the detailed reason is not known, it is believed that component [B] is functioning as not only a curing agent but also a catalyst for component [C]. In addition, there is no gelation during the mixing of components [B] and [C] due to a reaction between the two, while storage stability is excellent. Moreover, the mixing of the two beforehand tends to make it easier to mix them with component [A] by moderately increasing the viscosity of the curing agent pack.

It is preferable that the mass mixing ratio between components [B] and [C], [B]:[C], be 95:5 to 65:35, more preferably 95:5 to 81:19 and even more preferably 95:5 to 86:14. If [B] is more abundant than prescribed by the ratio [B]:[C]=95:5, the time required for curing becomes longer, and this sometimes reduces productivity. If, on the other hand, [C] is more abundant than prescribed by the ratio [B]:[C]=65:35, the viscosity of the obtained resin composition becomes high, and this sometimes reduces mixability and reinforcing fiber impregnability.

It is preferable that the combined blending quantity of components [B] and [C] be one that satisfies the condition that the H/E ratio is 0.8 to 1.1, more preferably 0.85 to 1.05 and even more preferable 0.9 to 1.0, where H is the sum of the number of acid anhydride groups present in component [B] and that of hydroxyl groups present in component [C] and E is the total number of epoxy groups present in the total epoxy resin, including component [A]. If the H/E ratio falls below 0.8, the polymerization of any excess epoxy resins progresses, and this leads to a deterioration in the physical properties of cured products. If, on the other hand, the H/E ratio exceeds 1.1, any excess amounts of the curing agent pack reduces the concentration of the reaction system at the reaction point, leading to a reduction in the reaction speed and thus a failure to exhibit adequately fast curing performance.

It is necessary that the epoxy resin composition contain an organic phosphorus compound or imidazole derivative as component [D] to act as a curing accelerator for fast curing. It is necessary that, from the viewpoint of ease of handling and fast curing performance in the molding temperature region, component [D] have a melting point of 130° C. or less, preferably being liquid at room temperature or having a melting point of 90° C. or less. Though the detailed mechanism is not known, an organic phosphorus compound or imidazole derivative is able to increase the length of the low-viscosity period by restraining the progress of the curing reaction of the epoxy resin composition at the initial stage and shorten the curing time by providing sufficiently high curing reaction speed in the intermediate and late stages. For this reason, it is advantageously used as a curing accelerator. It is preferable that the blending quantity of component [D] be 5 to 25 parts by mass, more preferably 10 to 20 parts by mass, for 100 parts by mass of the total epoxy resin, including component [A]. If component [D] is less abundant than 5 parts by mass, the time needed for curing lengthens, often resulting in a failure to exhibit adequately fast curing performance. If, on the other hand, component [D] is more abundant than 25 parts by mass, the low-viscosity period shortens, often resulting in difficult reinforcing fiber impregnation.

Specific examples of an organic phosphorus compound include tributyl phosphine (liquid at room temperature), trioctyl phosphine (liquid at room temperature), tricyclohexyl phosphine (melting point 82° C.), triphenyl phosphine (melting point 80° C.), tribenzyl phosphine (melting point 99° C.), tri-o-tolyl phosphine (melting point 124° C.), tri-m-tolyl phosphine (melting point 98° C.), diphenyl cyclohexyl phosphine (melting point 60° C.), and 1,3-bis(diphenyl phosphino)propane (melting point 64° C.).

Specific examples of an imidazole derivative include imidazole (melting point 89° C.), 2-ethyl imidazole (melting point 80° C.), 2-undecyl imidazole (melting point 72° C.), 2-heptadecyl imidazole (melting point 89° C.), 1,2-dimethyl imidazole (liquid at room temperature), 2-ethyl-4-methyl imidazole (liquid at room temperature), 1-benzyl-2-phenyl imidazole (liquid at room temperature), 1-benzyl-2-methyl imidazole (liquid at room temperature), and 1-cyanoethyl-2-methyl imidazole (liquid at room temperature).

It is preferable that the epoxy resin composition have a viscosity at 25° C. of 0.1 to 2.5 Pa·s, more preferably 0.1 to 2.0 Pa·s. Setting the viscosity at 25° C. to 2.5 Pa·s or less makes it possible to lower the viscosity at the molding temperature and shorten the time required to impregnate the reinforcing-fiber base, thus eliminating the cause for impregnation failure. Setting the viscosity at 25° C. to 0.1 Pa·s or more, on the other hand, makes it possible to avoid pitting, attributable to the trapping of air during the impregnation of the reinforcing-fiber base, and prevent the generation of unimpregnated regions, attributable to uneven impregnation, by keeping the viscosity at the molding temperature sufficiently high.

Viscosity is determined by measuring the viscosity of the epoxy resin composition immediately after preparation via, for instance, the measuring method that uses a cone-and-plate rotational viscometer as specified in ISO 2884-1 (1999). Examples of actual measuring equipment include the model TVE-30H, manufactured by Toki Sangyo Co., Ltd.

It is preferable that the epoxy resin composition have a specific temperature T at which t10 and t90 satisfy the following three relational expressions:

$$0.5 \leq t10 \leq 4 \qquad \text{(expression 1)}$$

$$0.5 \leq t90 \leq 9 \qquad \text{(expression 2)}$$

$$1 < t90/t10 \leq 2.5 \qquad \text{(expression 3)}$$

where t10 and t90 are lengths of time (in minutes) that the cure index, as obtained in a dielectric measurement performed while maintaining a constant temperature, takes to reach 10% and 90%, respectively, from the start of the measurement.

Dielectric measurement is beneficial in obtaining the curing profile of a thermosetting resin as it transforms from a low-viscosity liquid to an amorphous solid with a high elastic modulus, though it is unable to directly measure viscosity or elastic modulus. With dielectric measurement, the curing profile of a thermosetting resin is obtained from the change in ion viscosity (equivalent resistivity) with time as calculated from the complex dielectric constant measured by applying a high-frequency electric field.

As dielectric measurement equipment, the curing monitor model MDE-10, manufactured by Holometrix-Micromet, for instance, is available. The procedure begins with the installation of a Viton O-ring with an inside diameter of 32 mm and a thickness of 3 mm on the underside of an MP2000 programmable mini press featuring an embedded-into-the-bottom TMS-1 inch-type sensor and the setting of the temperature of the press to a predetermined value, T. An epoxy resin composition is then poured into the hollow inside the O-ring. After the press is closed, the change in the ion viscosity of the resin composition with time is tracked. A dielectric measurement is performed at frequencies of 1, 10, 100, 1000 and 10000 Hz, and the frequency-independent logarithm Log($\alpha$) of ion viscosity is obtained using the software bundled with the equipment (Yu metric).

The cure index at the required curing time, t, is obtained using expression 4, with the times at which the cure index reaches 10% and 90% denoted as t10 and t90, respectively.

$$\text{Cure index} = \{\log(\alpha t) - \log(\alpha \min)\}/\{\log(\alpha \max) - \log(\alpha \min)\} \times 100 \quad \text{(expression 4)}$$

Cure index: (unit: %)
$\alpha t$: Ion viscosity at time t (unit: $\Omega \cdot$cm)
$\alpha$min: Minimum value of ion viscosity (unit: $\Omega \cdot$cm)
$\alpha$max: Maximum value of ion viscosity (unit: $\Omega \cdot$cm).

Tracking ion viscosity in a dielectric measurement is relatively easy even if the curing reaction is fast. Moreover, ion viscosity can be measured even after gelation and, in addition to the initial change in viscosity, this same process can be used to track the progress of the curing reaction since ion viscosity has a property that increases with the progress in curing and become saturated upon completion of curing. As shown above, the cure index is derived from the logarithm of ion viscosity by standardizing its values such that the minimum value and the saturated value (maximum value) become 0% and 100%, respectively. It is used to describe the curing profile of a thermosetting resin. Using the time required for the cure index to reach 10% as the indicator of the speed of the initial rise in viscosity and the time required for the cure index to reach 90% as the indicator of the curing time makes it possible to describe the preferable conditions for a slow initial rise in viscosity and fast curing.

The meanings of the three relational expressions shown above are now summarized. First, t10, which is proportional to the time required for an epoxy resin composition to become fluid at the specific temperature T (fluidizability time), is 0.5 to 4 minutes (expression 1). Second, t90, which is proportional to the time required for the curing of an epoxy resin composition to complete to allow demolding (demoldability time), is 0.5 to 9 minutes (expression 2). Third, the ratio between the fluidizability time and demoldability time of an epoxy resin composition is more than 1 and 2.5 or less (expression 3). Namely, since these expressions mean that, within the above ranges, the larger t10 is the better the reinforcing-fiber impregnability of an epoxy resin composition and the smaller t90 is the faster the curing of an epoxy resin composition, it is more preferable that t90/t10 be as small as possible within 1 (exclusive) to 2.5 (inclusive).

Taking into consideration the balance with the molding temperature to be described later, it is preferable that the molding temperature (thermal curing temperature) of an epoxy resin composition, namely the specific temperature T, be 90 to 130° C. Setting the specific temperature T to 90 to 130° C. makes it possible to obtain a fiber-reinforced composite material with good surface quality by simultaneously shortening the time required for curing and alleviating the post-demolding heat shrinkage.

The two-pack epoxy resin composition is obtained by first preparing a base resin pack containing an epoxy resin, labeled component [A], as the primary component and a curing agent pack containing curing agents, labeled components [B] and [C], as the secondary components at the blending quantities specified above and, immediately before use, mixing them while adhering to the specified blending quantities. Though component [D] may be blended into either the base resin pack or curing agent pack, it is more preferable that it be included in the curing agent pack. Other blending components may be blended into whichever pack so that they may, in advance, be blended into either the base resin pack or curing agent pack, or even both.

It is preferable that the curing agent pack for fiber-reinforced composite materials comprise component [B], [C] and [D]. It is preferable that the viscosity at 25° C. of such a curing agent pack for fiber-reinforced composite materials be 0.05 to 1.8 Pa·s, more preferably 0.05 to 0.7 Pa·s. This is because setting the viscosity of the curing agent pack to 1.8 Pa·s or less makes it possible to shorten the reinforcing fiber impregnation time and eliminate the cause of impregnation failure by making the viscosity of the resin composition at the molding temperature low. Setting the viscosity of the curing agent pack to 0.05 Pa·s or more makes it possible to avoid pitting, attributable to the trapping of air during the impregnation of the reinforcing-fiber base, and prevent the generation of unimpregnated regions, attributable to uneven impregnation, by keeping the viscosity at the molding temperature sufficiently high.

It is advisable that the base resin pack and curing agent pack be separately heated before mixing and it is also preferable that they be mixed to obtain an epoxy resin composition immediately before use, e.g., injection into a mold, using a mixer from the viewpoint of the handleable period of the resin.

A fiber-reinforced composite material is obtained from the two-pack epoxy resin composition by combining it with reinforcing fibers and curing it. Though there are no specific limitations on the molding method for a fiber-reinforced composite material, the hand lay-up method, filament winding method, pultrusion method, resin transfer molding (RTM) method and other molding methods based on a two-pack resin are advantageously used. Of them, the RTM method is particularly advantageous from the viewpoint of, for instance, productivity and the degree of freedom in the shape of the molding. The RTM method is designed to obtain a fiber-reinforced composite material by impregnating a reinforcing-fiber base placed in a mold with a resin and curing the resin.

Using such an RTM method as an example, the procedure to produce a fiber-reinforced composite material is described. First, the epoxy resin composition is obtained in the manner described above. It is preferable that a fiber-reinforced composite material be produced by preheating the epoxy resin composition, injecting it into a mold that has been preheated to the specific temperature T and holding a reinforcing-fiber base to impregnate the fibers, and curing the resin inside the mold.

It is preferable that the temperature at which to heat the epoxy resin composition, to be determined from the relationship between the initial viscosity of the epoxy resin composition and the rise in viscosity, be 40 to 70° C., more preferably 50 to 60° C., from the viewpoint of the impregnability of the reinforcing-fiber base.

In addition, it is preferable that, with such a fiber-reinforced composite material production method, appropriate conditions, e.g., the use of a mold with two or more injection ports and injection of an epoxy resin composition from those injection ports simultaneous or consecutively, be chosen according to the fiber-reinforced composite material to be produced from the viewpoint of obtaining a high degree of freedom in the shape or size of the molding. There are no restrictions on the number or shape of injection ports, and, to make quick injection possible, the more injection ports there are the better, and it is preferable that they be geometrically arranged to keep the resin flow distances as short as possible according to the shape of the molding.

The injection pressure of the epoxy resin composition is usually 0.1 to 1.0 MPa. Though the vacuum-assisted resin transfer molding (VaRTM) method, in which the mold is vacuum-aspirated before the injection of the resin composition, may be used, it is preferable that the injection pressure be 0.1 to 0.6 MPa from the viewpoint of injection time and economic efficiency of equipment. It is also preferable that, even in the case of using compression injection, the mold be vacuum-aspirated before the injection of the resin composition to suppress the generation of voids.

With a fiber-reinforced composite material, glass fiber, aramid fiber, carbon fiber, boron fiber and the like are advantageously used as reinforcing fibers. Of them, carbon fiber is particularly advantageous for the reason that it makes it possible to obtain fiber-reinforced composite materials that excel in strength, elastic modulus and other mechanical and physical properties, despite being lightweight.

Reinforcing fibers may be either short fibers or continuous fibers or even a combination of both. To obtain a fiber-reinforced composite material with a high Vf, continuous fibers are preferable.

With a fiber-reinforced composite material, reinforcing fibers are sometimes used in strand form, but reinforcing-fiber bases made of reinforcing fibers worked into a mat, woven fabric, knit fabric, braid, unidirectional sheet or a similar form are advantageously used. Of these, woven fabrics are particularly advantageous as they are suited to producing high-Vf fiber-reinforced composite materials and are excellent in handleability.

The ratio of the net reinforcing fiber volume of a woven fabric to its apparent volume is defined as the fiber packing ratio of a woven fabric. The fiber packing ratio of a woven fabric is obtained from the weight per unit surface area of the woven fabric W (unit: $g/m^2$), thickness t (unit: mm) and density of the reinforcing fiber $\rho f$ (unit: $g/cm^3$) based on the expression $W/(1000t·\rho f)$. The surface-area weight density (weight per unit surface area) and thickness of the woven fabric are obtained in accordance with JIS R 7602 (1995). Since the higher the fiber packing ratio of a woven fabric, the easier it is to get a high-Vf fiber-reinforced composite material, it is necessary that the fiber packing ratio of a woven fabric be 0.10 to 0.85, preferably 0.40 to 0.85 and more preferably 0.50 to 0.85.

To ensure that a fiber-reinforced composite material has a high specific strength or specific modulus, it is necessary that its volume fraction of fiber Vf be 40 to 85%, preferably 45 to 85%. The volume fraction of fiber Vf of a fiber-reinforced composite material as specified here is a value defined and measured as shown below in accordance with ASTM D3171 (1999) and applies to the post-impregnation and post-curing state. In specific terms, the volume fraction of fiber Vf of a fiber-reinforced composite material can be obtained from thickness h using the expression below:

$$\text{Volume fraction of fiber } Vf(\%) = (Af \times N)/(\rho f \times h)/10 \quad \text{(expression 5)}$$

Af: Weight of fiber base per unit area ($g/m^2$)
N: Number of laminated fiber bases
$\rho f$: Density of reinforcing fiber ($g/cm^3$)
h: Thickness of fiber-reinforced composite material (test piece) (mm).

When the weight of a fiber base per unit area Af, number of laminated fiber bases N or density of the reinforcing fiber $\rho f$ is unknown, the volume fraction of fiber of a fiber-reinforced composite material is measured using any of the combustion method, nitric acid decomposition method and sulfuric acid decomposition method as specified in JIS K 7075 (1991). In such cases, the value of the density of the reinforcing fiber used should be one measured in accordance with JIS R 7603 (1999).

There are no specific limitations on the specific method to measure the thickness h of a fiber-reinforced composite material as long as it is capable of correctly measuring the thickness of a fiber-reinforced composite material. However, it is preferable that, as described in JIS K 7072 (1991), thickness be measured using a micrometer as specified in JIS B 7502 (1994) or any other device with equivalent or greater accuracy. If the thickness of a fiber-reinforced composite material cannot be measured due to a complex shape, samples (samples with a degree of suitability for measurement in terms of shape and size) may be cut out of the fiber-reinforced composite material and subjected to a measurement.

One of the preferable forms of a fiber-reinforced composite material is a veneer. Other preferable forms include a sandwich structure, in which veneer-like fiber-reinforced composite materials are placed against a core material on two opposing sides, and a hollow structure, in which veneer-like structures are joined in a closed chain to leave a hollow inside, and a canapes structure, in which a veneer-like fiber-reinforced composite material is placed against a core material on one side.

Examples of a core material in a sandwich structure or canapé structure include an aluminum or aramid honeycomb core, a polyurethane, polystyrene, polyamide, polyimide, polyvinyl chloride, phenol resin, acrylic resin, epoxy resin or other formed plastic core, or a balsa or other wooden core. Of these, a formed plastic core is particularly advantageously used as a core material for the reason that it makes it possible to obtain a lightweight fiber-reinforced composite material.

Fiber-reinforced composite materials are advantageously used in structural members and outer panels of aircraft, satellites, industrial machines, rail vehicles, vessels, motor vehicles and the like as they have excellent mechanical characteristics such as strength and elastic modulus, while being lightweight. They are particularly advantageously used in outer panels of motor vehicles because of their excellent color tone, surface quality and dimensional accuracy.

EXAMPLES

The epoxy resin composition is described in further detail below using examples.
Resin Ingredients
To obtain resin compositions for various examples, the resin ingredients listed below were used. Unless otherwise specified, the unit used to quantitatively express the constitutions of resin compositions in Tables 1 and 2 is parts by mass.
1. Epoxy resin
    "EPOTOHTO" (registered trademark) YD-128 (manufactured by Nippon Steel Chemical Co., Ltd.): Bisphenol A-type epoxy resin, epoxy equivalent 189
    "CELLOXIDE" (registered trademark) 2021P (manufactured by Daicel Chemical Industries, Ltd.): Alicyclic epoxy resin, epoxy equivalent 137
2. Acid anhydride
    HN-5500 (manufactured by Hitachi Chemical Co., Ltd.): Methyl hexahydro phthalic anhydride
    "KAYAHARD" (registered trademark) MCD (manufactured by Nippon Kayaku Co., Ltd.): Methyl nadic anhydride
3. Compound that has average of 2.5 or more hydroxyphenyl structures in each molecule Phenol novolac resin: H-4 (manufactured by Meiwa Plastic Industries, Ltd.), softening point 71° C., number of hydroxyphenyl structures 4.7

Phenol novolac resin: HF-3M (manufactured by Meiwa Plastic Industries, Ltd.), softening point 96° C., number of hydroxyphenyl structures 6.4

Phenol novolac resin: "PHENOLITE" (registered trademark) TD-2091 (manufactured by DIC Corp.), softening point 110° C., number of hydroxyphenyl structures 7.4

Cresol novolac resin: "PHENOLITE" (registered trademark) KA-1160 (manufactured by DIC Corp.), softening point 86° C., number of hydroxyphenyl structures 8.0

Phenol aralkyl resin: MEH-7800SS (manufactured by Meiwa Plastic Industries, Ltd.), softening point 65° C., number of hydroxyphenyl structures 2.8

4. Curing accelerator

Triphenyl phosphine "TPP" (manufactured by K.I Chemical Industry Co., Ltd.), melting point 80° C.

Tri-o-tolyl phosphine "TOTP" (manufactured by Hokko Chemical Industry Co., Ltd.), melting point 124° C.

"CUREZOL" (registered trademark) 12DMZ (manufactured by Shikoku Chemicals Corp.): 1,2-Dimethyl imidazole, liquid at room temperature "CUREZOL" (registered trademark) 2PZ (manufactured by Shikoku Chemicals Corp.): 2-Phenyl imidazole, melting point 140° C.

5. Other substances

Bisphenol F (manufactured by Honshu Chemical Industry Co., Ltd.), melting point 163° C.

Preparation of Epoxy Resin Composition

Various base resin packs were obtained by mixing epoxy resins at compounding ratios specified in Tables 1 and 2. Various curing agent packs were obtained by mixing an acid anhydride, a compound that has an average of 2.5 or more hydroxyphenyl structures in each molecule and a curing accelerator at compounding ratios specified in Tables 1 and 2.

By mixing such base resin packs and curing agent packs in various combinations and at various compounding ratios as specified in Tables 1 and 2, a range of epoxy resin compositions were prepared.

Measurement of Viscosity of Base Resin Pack, Curing Agent Pack and Resin Composition Immediately after preparation, the viscosity of each epoxy resin composition was measured using a measuring method based on a cone-and-plate rotational viscometer in accordance with ISO 2884-1 (1999). The actual equipment chosen was a TVE-30H from Toki Sangyo Co., Ltd. with a 1° 34'× R24 rotor. The sample quantity was 1 cm$^3$.

Dielectric Measurement

To track resin curing, a dielectric measurement was conducted. As dielectric measurement equipment, an MDE-10curing monitor from Holometrix-Micromet was chosen. The procedure began with the installation of a Viton O-ring with an inside diameter of 32 mm and a thickness of 3 mm on the underside of an MP2000 programmable mini press featuring an embedded-into-the-bottom TMS-1 inch-type sensor and the setting of the temperature of the press to 100° C. An epoxy resin composition was then poured into the hollow inside the O-ring. After the press was closed, the change in the ion viscosity of the resin composition with time was tracked. A dielectric measurement was performed at frequencies of 1, 10, 100, 1000 and 10000 Hz, and the frequency-independent logarithm Log($\alpha$) of ion viscosity was obtained using the software bundled with the equipment.

Next, the cure index was obtained using expression 4, with the ratio of t10, the time at which the cure index would reach 10%, to t90, the time at which the cure index would reach 90%, t90/t10 found.

$$\text{Cure index} = \{\log(\alpha t) - \log(\alpha \min)\}/\{\log(\alpha \max) - \log(\alpha \min)\} \times 100 \quad \text{(expression 4)}$$

Cure index: unit: %)
$\alpha t$: Ion viscosity at time t (unit: $\Omega \cdot cm$)
$\alpha \min$: Minimum value of ion viscosity (unit: $\Omega \cdot cm$)
$\alpha \max$: Maximum value of ion viscosity (unit: $\Omega \cdot cm$).

Preparation of Cured Resin Plate

A 2 mm-thick copper spacer produced by making a hole in the middle of a 50 mm-square specimen was installed on the underside of the press equipment, and the press temperature was set to 110° C. An epoxy resin composition was then poured through the hole of the spacer, and the press was closed. Twenty minutes later, the press was opened, and a cured resin plate was obtained.

Measurement of Glass Transition Temperature Tg of Cured Resin Product

A test piece 12.7 mm wide and 40 mm long was cut out of the cured resin plate, and a torsional DMA measurement was conducted using a rheometer (ARES manufactured by TA Instruments). As a measurement condition, the heating speed was set to 5° C./min. The temperature at which the storage modulus curve obtained in the measurement had an inflection point G' was denoted as Tg.

Preparation of Fiber-Reinforced Composite Material

A fiber-reinforced composite material prepared via the RTM method described below was used for dynamic tests.

With a metal mold with a shallow rectangular cavity measuring 350 mm×700 mm×2 mm provided, nine pieces of the carbon-fiber woven fabric CO6343 (carbon fiber: T300-3K, structure: plain weave, surface-area weight density (weight per unit surface area): 198 g/m$^2$, manufactured by Toray Industries, Inc.) were placed in the cavity as reinforcing fibers and mold-clamped using press equipment. After holding the metal mold at 100° C. (molding temperature), its internal pressure was lowered to atmospheric pressure-0.1 MPa using a vacuum pump. Next, the base resin pack and curing agent pack of an epoxy resin composition, both preheated to 50° C., were mixed and injected at a pressure of 0.2 MPa using a resin injector. Twenty minutes (curing time) after the injection of the epoxy resin composition began, the metal mold was opened, and a fiber-reinforced composite material was obtained by demolding.

Resin Mixability

Workability during resin mixing as part of the preparation of the above fiber-reinforced composite material was comparatively evaluated in three grades as follows: ○ if mixing occurs easily when stirring is provided with a spatula; Δ if solid components become flushed out but dissolve soon as stirring is provided with a spatula (practically inferior to ○ as stirring work takes time); and ×solid components become flushed out and do not completely dissolve no matter how much stirring is provided with a spatula. In concrete terms, the evaluation covered both mixing work during the preparation of the curing agent pack and mixing work during the mixing of the base resin pack and curing agent pack.

Reinforcing Fiber Impregnability of Resin

Workability during resin injection as part of the preparation of the above fiber-reinforced composite material was comparatively evaluated in three grades as follows: ○ if the void content of the molding is less than 1%, i.e., voids are virtually non-existent; Δ if the void content of the molding is 1% or more though the appearance of the molding does not indicate the presence of unimpregnated regions; and ×if the appearance of the molding indicates the presence of unimpregnated regions.

In this regard, the void content of a molding is a quantity measured by observing a smoothly polished cross section of the molding using an incident-light microscope and calculating the proportion of the combined area accounted for by voids.

Demoldability of Fiber-Reinforced Composite Material

Workability during demolding as part of the preparation of the above fiber-reinforced composite material was comparatively evaluated in three grades as follows: ○ if the molding can be easily removed from the mold using a spatula without any resistance; Δ if the molding can be demolded without any plastic deformation to it despite meeting resistance (practically inferior to as demolding work takes time); and × if demolding is difficult or plastic deformation occurs to the molding during demolding.

Examples 1 to 14

An epoxy resin composition was prepared and then subjected to a viscosity measurement and dielectric measurement as described above. In addition, a cured resin plate and fiber-reinforced composite material were prepared in the manner described above using the prepared epoxy resin composition.

As shown in Tables 1 and 2, the epoxy resin composition has excellent mixability as both the base resin pack and curing agent pack are of low viscosity and similar in viscosity level. Since the fluidizability time at 100° C., denoted as t10, is long, reinforcing fiber impregnability and penetrability are excellent during the molding step (molding temperature 110° C.). In addition, since the demoldability time at 100° C., denoted as t90, is short, the value of t90/t10 at 100° C. is sufficiently small, indicating that it is also effective in shortening the molding time of the fiber-reinforced composite material. Furthermore, since the Tg of the cured resin product exceeds 130° C., demolding is easily accomplished without causing deformation to the molding.

Comparative Examples 1 to 4

An epoxy resin composition was prepared and then subjected to a viscosity measurement and dielectric measurement as described above. In addition, a cured resin plate and fiber-reinforced composite material were prepared in the manner described above using the prepared epoxy resin composition.

As shown in Tables 1 and 2, epoxy resin compositions that fall outside our range do not have satisfactory characteristics. First, with Comparative Example 1, which does not contain component [C], the cured resin product has a low Tg compared to our Examples and is inferior in terms of the demoldability of the fiber-reinforced composite material. With Comparative Example 2, which does not contain component [B], the viscosity of the curing agent pack is high, resulting in inferior resin mixability, while viscosity stays high even after the mixing of the base resin pack and curing agent pack, resulting in inferior reinforcing fiber impregnability.

Next, with Comparative Example 3, which contains bisphenol F instead of component [C] ingredients, the Tg of the cured resin product is low compared to our Examples, resulting in inferior demoldability of the fiber-reinforced composite material.

Comparative Example 4, which uses an imidazole derivative whose melting point is higher than 130° C. as component [D], has a long curing time compared to our Examples, resulting in low productivity during the molding step.

As can be seen from the above, our epoxy resin compositions are suited to the molding of a fiber-reinforced composite material, and thus provide fiber-reinforced composite materials with excellent appearance and surface quality quickly and efficiently via the RTM method and the like. Our epoxy resin compositions are also amenable to the molding of a large fiber-reinforced composite material and are particular advantageously applied to motor vehicle structural members.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Epoxy resin composition | [A] Epoxy resin | YD128 | 100 | 100 | 100 | 100 | 100 | 100 | 100 | 100 | 100 |
| | | CELLOXIDE 2021P | | | | | | | | | |
| | [B] Acid anhydride | HN-5500 | 61 | 72 | 58 | 83 | 85 | 79 | 82 | 45 | 42 |
| | | KAYAHARD MCD | | | | | | | | | |
| | [C] Compound that has average of 2.5 or more hydroxyphenyl structures in each molecule | H-4 | | | | 9 | 10 | | | 24 | 27 |
| | | HF-3M | 7 | 8 | 6.5 | | | 4.3 | 4 | | |
| | | TD-2091 | | | | | | | | | |
| | | KA-1160 | | | | | | | | | |
| | | MEH-7800SS | | | | | | | | | |
| | [D] Organic phosphorus compound or imidazole derivative | TPP | | | | 20 | 20 | 20 | 15 | | 15 |
| | | TOTP | 17 | 17 | | | | | 17 | | 19 |
| | | 12DMZ | | | | | | | | | |
| | | 2PZ | | | | | | | | | |
| | Other | Bisphenol F | | | | | | | | | |
| | | Mass mixing ratio [B]:[C] | 90:10 | 90:10 | 90:10 | 90:10 | 90:10 | 95:5 | 95:5 | 65:35 | 61:39 |
| | | H/E ratio | 0.81 | 0.95 | 0.77 | 1.09 | 1.14 | 0.96 | 0.99 | 0.94 | 0.96 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Characteristics of pre-curing resin | Viscosity of pre-mixing base resin pack at 25° C. [Pa · s] | 11 | 11 | 11 | 11 | 11 | 11 | 11 | 11 | 11 |
|  | Viscosity of pre-mixing curing agent pack at 25° C. [Pa · s] | 0.12 | 0.1 | 0.14 | 0.12 | 0.16 | 0.08 | 0.07 | 0.35 | 0.4 |
|  | Initial viscosity of composition at 25° C. [Pa · s] | 1.7 | 1.3 | 1.9 | 1.3 | 1.4 | 1.2 | 1.1 | 2.4 | 2.5 |
|  | t10 [min] at 100° C. | 2.9 | 2.7 | 2.2 | 2.5 | 2.2 | 2.5 | 2.7 | 2.0 | 2.0 |
|  | t90 [min] at 100° C. | 5.4 | 4.8 | 4.8 | 4.9 | 5.2 | 5.5 | 6.1 | 4.8 | 4.5 |
|  | t90/t10 1.9 at 100° C. | 1.9 | 1.8 | 2.2 | 2.0 | 2.4 | 2.2 | 2.3 | 2.4 | 2.3 |
| Characteristics of cured resin product | Glass transition temperature [° C.] | 122 | 135 | 121 | 126 | 124 | 136 | 136 | 123 | 120 |
| Moldability of fiber reinforced composite material | Resin mixability | ○ | ○ | ○ | ○ | ○ | ○ | ○ | ○ | ○ |
|  | Reinforcement fiber impregnability | ○ | ○ | ○ | ○ | ○ | ○ | ○ | ○ | Δ |
|  | Demoldability | ○ | ○ | ○ | ○ | ○ | ○ | ○ | ○ | ○ |

TABLE 2

|  |  |  | Example 10 | Example 11 | Example 12 | Example 13 | Example 14 | Comparative Example 1 | Comparative Example 2 | Comparative Example 3 | Comparative Example 4 |
|---|---|---|---|---|---|---|---|---|---|---|---|
| Epoxy resin composition | [A] Epoxy resin | YD128 | 75 | 100 | 100 | 100 | 100 | 100 | 100 | 100 | 100 |
|  |  | CELLOXIDE 2021P | 25 |  |  |  |  |  |  |  |  |
|  | [B] Acid anhydride | HN-5500 | 75 | 72 | 60 | 65 |  | 75 |  | 65 | 55 |
|  |  | KAYAHARD MCD |  |  |  |  | 70 |  |  |  |  |
|  | [C] Compound that has average of 2.5 or more hydroxyphenyl structures in each molecule | H-4 | 10 | 12 |  |  |  |  | 50 |  |  |
|  |  | HF-3M |  |  |  |  |  |  |  |  | 16 |
|  |  | TD-2091 |  |  |  | 13 |  |  |  |  |  |
|  |  | KA-1160 |  |  |  |  | 15 |  |  |  |  |
|  |  | MEH-7800SS |  |  |  |  | 20 |  |  |  |  |
|  | [D] Organic phosphorus compound or imidazole derivative | TPP |  |  |  |  |  | 20 | 20 | 20 |  |
|  |  | TOTP |  |  | 18 |  |  |  |  |  |  |
|  |  | 12DMZ | 10 |  |  | 10 | 10 |  |  | 10 |  |
|  |  | 2PZ |  |  |  |  |  |  |  |  | 10 |
|  | Other | Bisphenol F |  |  |  |  |  |  |  | 15 |  |
|  |  | Mass mixing ratio [B]:[C] | 88:12 | 86:14 | 82:18 | 81:19 | 78:22 | 100:0 | 0:100 | 100:0 | 77:23 |
|  |  | H/E ratio | 0.94 | 1.10 | 0.91 | 0.97 | 0.96 | 0.84 | 0.90 | 1.01 | 0.90 |
| Characteristics of pre-curing resin | Viscosity of pre-mixing base resin pack at 25° C. [Pa · s] |  | 7.5 | 11 | 11 | 11 | 11 | 11 | 11 | 11 | 11 |
|  | Viscosity of pre-mixing curing agent pack at 25° C. [Pa · s] |  | 0.4 | 0.2 | 0.9 | 0.7 | 1.8 | 0.06 | >1000 | 0.06 | 1.05 |
|  | Initial viscosity of composition at 25° C. [Pa · s] |  | 1.8 | 1.9 | 2.7 | 2.4 | 2.5 | 1.1 | >1000 | 1.1 | 1.9 |
|  | t10 [min] at 100° C. |  | 2.6 | 2.4 | 3.2 | 3.3 | 3.8 | 2.7 | 1.6 | 2.8 | 5.8 |
|  | t90 [min] at 100° C. |  | 5.8 | 5.3 | 5.3 | 5.1 | 7.6 | 7.1 | 6.2 | 8.8 | 14.5 |
|  | t90/t10 1.9 at 100° C. |  | 2.2 | 2.2 | 2.3 | 2.2 | 2.0 | 2.6 | 3.8 | 3.1 | 2.5 |
| Characteristics of cured resin product | Glass transition temperature [° C.] |  | 126 | 122 | 132 | 134 | 141 | 119 | 117 | 114 | 129 |
| Moldability of fiber reinforced composite material | Resin mixability |  | ○ | ○ | ○ | ○ | ○ | Δ | x | Δ | Δ |
|  | Reinforcement fiber impregnability |  | ○ | ○ | Δ | ○ | Δ | ○ | x | ○ | Δ |
|  | Demoldability |  | ○ | ○ | ○ | ○ | ○ | Δ | Δ | x | ○ |

INDUSTRIAL APPLICABILITY

Since the epoxy resin composition offers excellent workability during resin preparation, cures quickly during the molding step and provides high-quality fiber-reinforced composite materials, it makes it possible to supply high-quality fiber-reinforced composite materials with high productivity via the RTM method and the like. This helps accelerate the application of fiber-reinforced composite materials to, in particular, automotive uses, and gives rise to hopes for improve-

The invention claimed is:

1. A fiber-reinforced composite material produced by combining a two-pack epoxy resin composition comprising a two-pack epoxy resin composition for fiber-reinforced composite materials comprising components [A] to [D], with component [D] being a liquid at room temperature or a solid having a melting point of 130° C. or less:
   a base resin pack containing component [A] an epoxy resin; and
   a curing agent pack containing components [B] an acid anhydride and [C] a compound having an average of 2.5 or more hydroxyphenyl structures in each molecule, which has a mass mixing ratio between components [B] and [C] of 95:5 to 86:14;
   wherein component [D] an organic phosphorus compound or imidazole derivative is blended into either the base resin pack or the curing agent pack with reinforcing fibers and curing the composition.

2. The fiber-reinforced composite material according to claim 1, where the reinforcing fibers are carbon fiber.

3. A fiber-reinforced composite material produced by combining a two-pack epoxy resin composition with reinforcing fibers and curing the composition, wherein the two-pack epoxy resin composition comprises components [A] to [D], with component [D] being a liquid at room temperature or a solid having a melting point of 130° C. or less:
   a base resin pack containing component [A] an epoxy resin; and
   a curing agent pack containing components [B] an acid anhydride and
   [C] a compound having an average of 2.5 or more hydroxyphenyl structures in each molecule;
   wherein component [D] an organic phosphorus compound or imidazole derivative is blended into either the base resin pack or the curing agent pack and the two-pack epoxy resin composition has a viscosity at 25° C. of 0.1 to 2.5 Pa·s.

4. A fiber-reinforced composite material produced by combining a two-pack epoxy resin composition with reinforcing fibers and curing the composition, wherein the two-pack epoxy resin composition comprises components [A] to [D], with component [D] being a liquid at room temperature or a solid having a melting point of 130° C. or less:
   a base resin pack containing component [A] an epoxy resin; and
   a curing agent pack containing components [B] an acid anhydride and
   [C] a compound having an average of 2.5 or more hydroxyphenyl structures in each molecule;
   wherein component [D] an organic phosphorus compound or imidazole derivative is blended into either the base resin pack or the curing agent pack and wherein the component [C] is a phenol novolac with a softening point of 100° C. or less or a cresol novolac with a softening point of 100° C. or less.

5. A fiber-reinforced composite material produced by combining a two-pack epoxy resin composition with reinforcing fibers and curing the composition, wherein the two-pack epoxy resin composition comprises components [A] to [D], with component [D] being a liquid at room temperature or a solid having a melting point of 130° C. or less:
   a base resin pack containing component [A] an epoxy resin; and
   a curing agent pack containing components [B] an acid anhydride and
   [C] a compound having an average of 2.5 or more hydroxyphenyl structures in each molecule which has a mass mixing ratio between components [B] and [C] of 95:5 to 81:19;
   wherein component [D] an organic phosphorus compound or imidazole derivative is blended into either the base resin pack or the curing agent pack.

6. A two-pack epoxy resin composition for fiber-reinforced composite materials comprising components [A] to [D], with component [D] being a liquid at room temperature or a solid having a melting point of 130° C. or less:
   a base resin pack containing component [A] an epoxy resin; and
   a curing agent pack containing components [B] an acid anhydride and [C] a compound having an average of 2.5 or more hydroxyphenyl structures in each molecule, which has a mass mixing ratio between components [B] and [C] of 95:5 to 86:14;
   wherein component [D] an organic phosphorus compound or imidazole derivative is blended into either the base resin pack or the curing agent pack, and the composition has a viscosity at 25° C. of 0.1 to 2.5 Pa·s.

7. The two-pack epoxy resin composition according to claim 6, wherein component [A] is a bisphenol epoxy resin.

8. The two-pack epoxy resin composition according to claim 6, wherein component [B] is an acid anhydride having an alicyclic structure.

9. The two-pack epoxy resin composition according to claim 6, wherein the component [C] is a phenol novolac with a softening point of 100° C. or less or a cresol novolac with a softening point of 100° C. or less.

10. A two-pack epoxy resin composition for fiber-reinforced composite materials comprising components [A] to [D], with component [D] being a liquid at room temperature or a solid having a melting point of 130° C. or less:
    a base resin pack containing component [A] an epoxy resin; and
    a curing agent pack containing components [B] an acid anhydride and [C] a compound having an average of 2.5 or more hydroxyphenyl structures in each molecule, which has a mass mixing ratio between components [B] and [C] of 95:5 to 86:14;
    wherein component [D] an organic phosphorus compound or imidazole derivative is blended into either the base resin pack or the curing agent pack and the composition is obtained by mixing a base resin pack mixing comprising component [A] and a curing agent pack comprising components [B], [C] and [D], and the curing agent pack has a viscosity at 25° C. of 0.05 to 1.8 Pa·s.

* * * * *